United States Patent
Jiang

(10) Patent No.: US 7,646,746 B2
(45) Date of Patent: Jan. 12, 2010

(54) METHOD AND APPARATUS FOR HANDLING UPLINK TRANSMISSION START IN A WIRELESS COMMUNICATIONS SYSTEM

(75) Inventor: Sam Shiaw-Shiang Jiang, Taipei (TW)

(73) Assignee: Innovative Sonic Limited, Tortola (VG)

( * ) Notice: Subject to any disclaimer, the term of this patent is extended or adjusted under 35 U.S.C. 154(b) by 540 days.

(21) Appl. No.: 11/727,566

(22) Filed: Mar. 27, 2007

(65) Prior Publication Data

US 2007/0230398 A1    Oct. 4, 2007

Related U.S. Application Data

(60) Provisional application No. 60/743,942, filed on Mar. 29, 2006.

(51) Int. Cl.
*H04W 4/00* (2009.01)
(52) U.S. Cl. .................. 370/328; 370/310; 370/329; 370/335
(58) Field of Classification Search ............ 370/328
See application file for complete search history.

(56) References Cited

U.S. PATENT DOCUMENTS

2005/0176430 A1    8/2005   Lee et al.

FOREIGN PATENT DOCUMENTS

| KR | 10-2005-0073261 | 7/2005 |
| KR | 10-2005-0118071 | 12/2005 |
| WO | 2005/109690 | 11/2005 |

OTHER PUBLICATIONS

Huawei, "E-DCH Serving Grant Update", R2-060547, 3GPP, Feb. 13-17, 2006.
Huawei, "E-DCH Serving Grant Update", R2-060623, 3GPP, Feb. 13-17, 2006.
3GPP TS 25.321 V6.7.0 (Dec. 2005), Medium Access Control (MAC) Protocol Specification (Release 6).

*Primary Examiner*—Vincent P Harper
*Assistant Examiner*—Natasha Cosme
(74) *Attorney, Agent, or Firm*—Winston Hsu

(57) ABSTRACT

A method for handling uplink transmission start used in a mobile of a wireless communications system includes when an uplink transmission is started, if a predefined information element (IE) is not received, setting a primary state variable to "none" to indicate that a Serving Grant (SG) value can be affected by a Secondary Absolute Grant message.

4 Claims, 3 Drawing Sheets

METHOD AND APPARATUS FOR HANDLING UPLINK TRANSMISSION START IN A WIRELESS COMMUNICATIONS SYSTEM

CROSS REFERENCE TO RELATED APPLICATIONS

This application claims the benefit of U.S. Provisional Application No. 60/743,942, filed on Mar. 29, 2006 and entitled "Method and Apparatus for Starting Transmission in HSUPA," the contents of which are incorporated herein by reference.

BACKGROUND OF THE INVENTION

1. Field of the Invention

The present invention relates to a method and apparatus for handling uplink transmission start in a wireless communications system, and more particularly to a method and related apparatus for reducing signaling overhead and avoiding radio resource waste.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting third generation mobile telecommunication technology, the prior art provides High Speed Downlink Package Access (HSDPA) and High Speed Uplink Package Access (HSUPA), which are used to increase bandwidth utility rate and package data processing efficiency to improve uplink/downlink transmission rate.

HSUPA increases upstream network performance, reduces transmission delay by rapid retransmission of erroneous data transmissions, and can adjust transmission rate based on channel quality. To realize this type of "power control," HSUPA adopts technologies such as NodeB Scheduling, Hybrid Automatic Repeat Request (HARQ), Soft Handover, and Short Frame Transmission. Correspondingly, the 3rd Generation Partnership Project (3GPP) defines an Enhanced Dedicated Transport Channel (E-DCH) for controlling operations of HSUPA. E-DCH introduces new physical layer channels, such as E-HICH, E-RGCH, E-AGCH, E-DPCCH, and E-DPDCH, which are used for transmitting HARQ ACK/NACK, Uplink Scheduling Information, Control Plane information, and User Plane information. Detailed definitions of the above can be found in the Medium Access Control (MAC) protocol specification, "3GPP TS 25.321 V6.7.0," and are not given here.

Through NodeB Scheduling technology, a base station (Node B) is allowed to adjust transmission power of mobiles or user equipments (UEs) within its transmission range (cell), so as to control uplink transmission rate of the mobiles. Referring to sections 9.2.5.2.1 and 9.2.5.2.2 of the aforementioned MAC protocol specification, the network can provide Relative Grant (RG) messages and Absolute Grant (AG) messages to a mobile through an E-DCH Relative Grant Channel (E-RGCH) and an E-DCH Absolute Grant Channel (E-AGCH) respectively, so as to adjust the transmission grant of the mobile. The E-AGCH is a shared channel that use an E-DCH Radio Network Temporary Identifier (E-RNTI) in order to address the AG messages to specific mobiles. The AG messages are used to directly adjust the transmission grant of mobiles, and can be classified into two types, Primary and Secondary. The Primary AG message provides an uplink resource grant for a specified mobile served by a cell. The Secondary AG message provides an uplink resource grant for a group of mobiles served by the cell, so as to reduce signaling overhead. On the other hand, the AG message includes an AG value field and an AG scope field. The AG value field indicates the transmission resource the mobile is allowed to use in the next transmission. The AG scope field indicates that the applicability of the AG value is "Per HARQ process" or "All HARQ Processes," meaning whether the AG value field will affect one or all HARQ processes.

According to section 11.8.1.3.1 of the aforementioned MAC protocol specification, after a mobile receives an AG message, if the E-RNTI type is "Primary," the AG value is set to "INACTIVE," the AG scope is "Per HARQ process," and a 2 ms TTI is configured, then the mobile shall de-activate a current HARQ process, which is the process identified by the value of a variable CURRENT_HARQ_PROCESS. If the E-RNTI type is "Primary," the AG value is set to "INACTIVE," the AG scope is "All HARQ processes," and a secondary E-RNTI was configured by higher layers, then the mobile shall activate all HARQ processes, set Serving Grant (SG) value to stored secondary grant (Serving_Grant=Stored_Secondary_Grant), and set a primary grant state variable to "none" (Primary_Grant_Available=false), meaning that the SG value can be affected by Secondary AG messages.

Besides, if the AG value is different from "INACTIVE," and the E-RNTI type is "Secondary," then the mobile shall set the variable Stored_Secondary_Grant to the AG value. Oppositely, if the E-RNTI type is "Primary" or the variable Primary_Grant_Available is set to "False," then the mobile shall set the SG value to the AG value (Serving_Grant=AG value). Note that, definitions of "INACTIVE," "Stored_Secondary_Grant," "Primary_Grant_Available," and "Serving_Grant" can be found in section 3.1.2 of the aforementioned MAC protocol specification.

Therefore, when the Primary AG message sets the AG value to "INACTIVE" and the AG Scope indicates "Per HARQ process" while a 2 ms TTI is configured, the prior art simply de-activates the corresponding HARQ process and keeps the variable Primary_Grant_Available unchanged. The variable Primary_Grant_Available represents whether the SG value is only affected by the Primary AG and RG messages. If Primary_Grant_Available="True," the SG value is only affected by the Primary AG or RG messages. If Primary_Grant_Available="False," the SG value is affected by the Primary AG, Secondary AG, or RG messages.

In addition, according to section 11.8.1.3.1 of the aforementioned MAC protocol specification, when E-DCH transmission is started (a variable E_DCH_TRANSMISSION is set to "True" from "False"), the mobile shall activate all HARQ processes. At the same time, if the upper layer (Radio Resource Control, RRC) has provided an IE "Serving Grant," which contains IE's "Serving Grant value" and "Primary/Secondary Grant Selector," the mobile shall set the variables Serving_Grant and Primary_Grant_Available accordingly. Oppositely, if the IE "Serving Grant" is not provided, the mobile shall set the variable Serving_Grant to a parameter Zero_Grant to indicate that the SG value of the mobile is 0, and set the variable Primary_Grant_Available to "True" to indicate that the SG value is being affected by the Primary AG messages, and thus the SG value is not affected by the Secondary AG messages.

Therefore, by the prior art, when E-DCH transmission is started, if the IE "Serving Grant" is not provided, the variable Primary_Grant_Available is set to "True," and the SG value of the mobile is not affected by any Secondary AG message. Under such circumstance, the SG value will keep to be the parameter Zero_Grant unless a Primary AG message is received, and Secondary AG messages will not be able to change the SG value from Zero_Grant to a new value. In other words, the only way to grant HARQ processes of the mobile to transmit data is through the Primary AG messages. The advantage of the Secondary AG messages vanishes, and signaling overhead is increased.

SUMMARY OF THE INVENTION

According to the present invention, a method for handling uplink transmission start used in a mobile of a wireless communications system comprises when an uplink transmission is started, if a predefined information element (IE) is not received, setting a primary state variable to "none" to indicate that a Serving Grant (SG) value can be affected by a Secondary Absolute Grant message.

According to the present invention, a communications device of a wireless communications system utilized for efficiently handling uplink transmission start to avoid radio resource waste comprises a control circuit for realizing functions of the communications device, a processor installed in the control circuit for executing a program code to operate the control circuit, and a memory coupled to the processor for storing the program code. The program code comprises when an uplink transmission is started, if a predefined information element (IE) is not received, setting a primary state variable to "none" to indicate that a Serving Grant (SG) value can be affected by a Secondary Absolute Grant message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
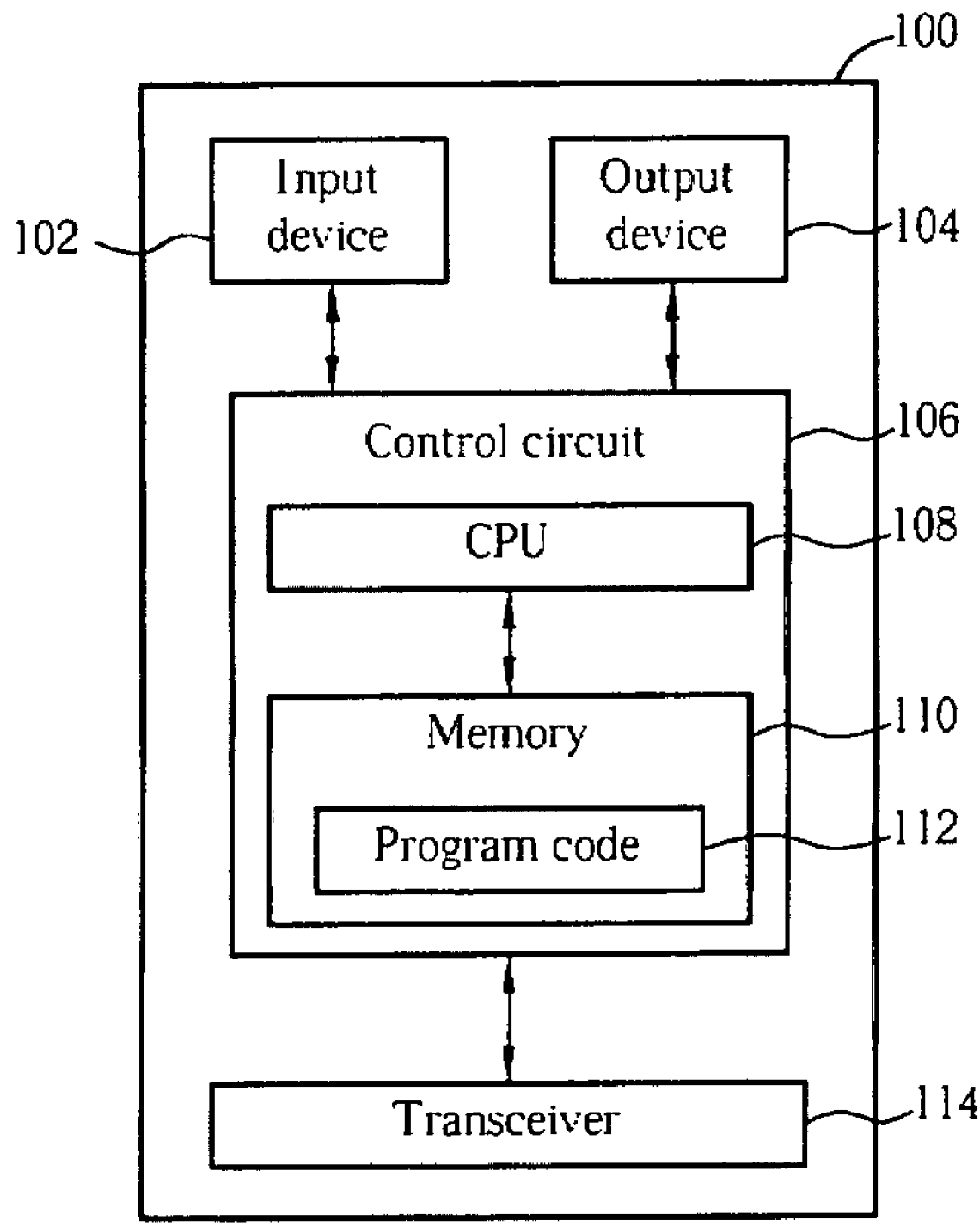
FIG. 1 is a function block diagram of a wireless communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
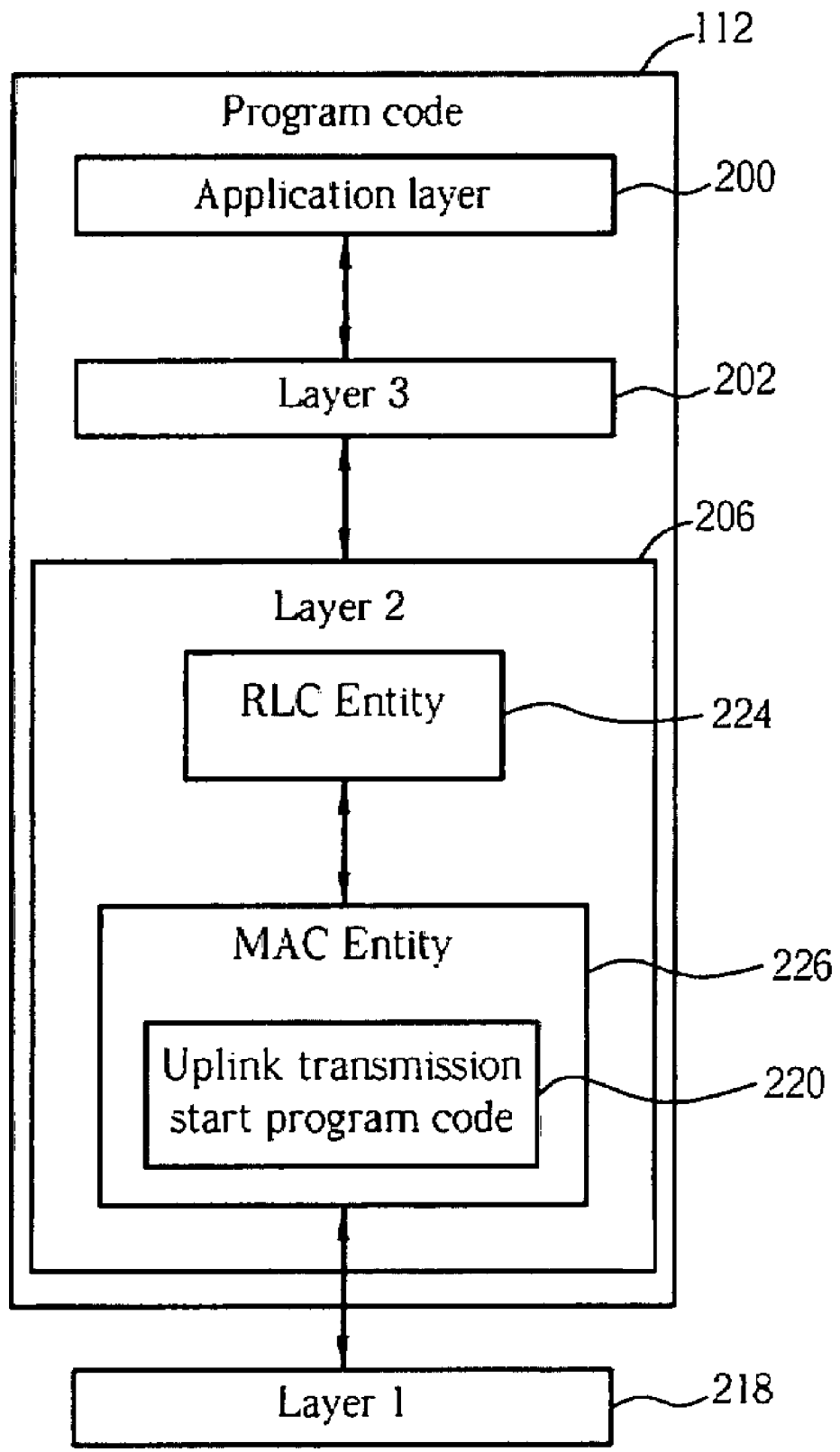
FIG. 2 is a diagram of program code of FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, ciphering, sequence check, and duplication detection on transmitted data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Figure 3:
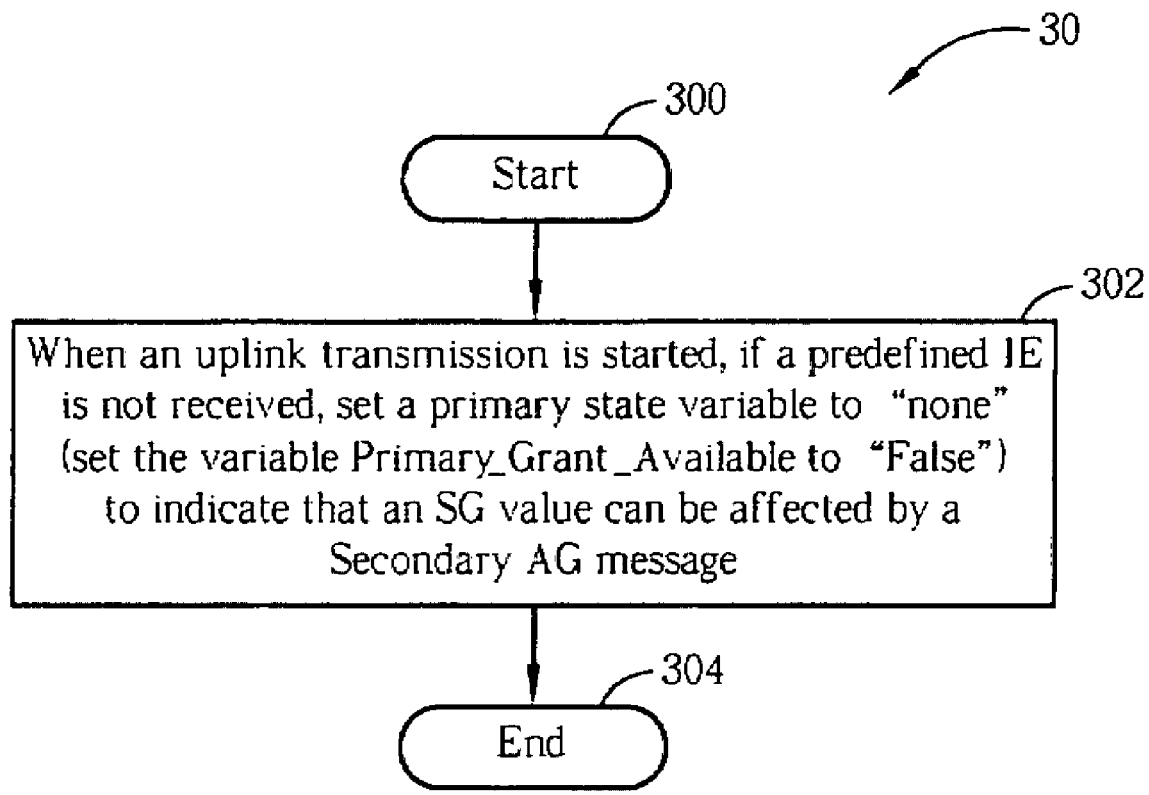
FIG. 3 is a flowchart of a process according to the embodiment of the present invention.

In some applications, such as when realizing high-speed uplink packet access (HSUPA) functions, the MAC entity 226 can start E-DCH transmission. In this situation, the embodiment of the present invention provides an uplink transmission start program code 220 utilized for handling uplink transmission start, in order to avoid radio resource waste, and reduce unnecessary transmissions. Please refer to FIG. 3, which is a flowchart diagram of a process 30 according to the embodiment of the present invention. The process 30 is utilized in a mobile of the wireless communications system for handling uplink transmission start, and can be complied into the uplink transmission start program code 220. The process 30 comprises the following steps:

Step 300: Start.

Step 302: When an uplink transmission is started, if a predefined IE is not received, set a primary state variable to "none" (set the variable Primary_Grant_Available to "False") to indicate that an SG value can be affected by a Secondary AG message.

Step 304: End.

According to the process 30, when E-DCH transmission is started (the variable E_DCH_TRANSMISSION is set to "True" from "False"), if the mobile does not receive the predefined IE, which is preferably the IE "Serving Grant" containing the IE's "Serving Grant value" and "Primary/Secondary Grant Selector," the mobile shall set the variable Primary_Grant_Available to "False," meaning that the SG value of the mobile can be affected by the Secondary AG messages.

Therefore, through the embodiment of the present invention, when E-DCH transmission is started, if the IE "Serving Grant" is not provided, the variable Primary_Grant_Available is set to "False," such that the SG value of the mobile can be affected by the Secondary AG messages. In this situation, the mobile can use the AG values identified by the Second AG messages, and further HARQ processes can be affected by the Second AG messages, so that the network can control the grant of the mobile with the Secondary AG messages, and signaling overhead can be reduced accordingly.

As mentioned above, the Primary AG message provides the uplink resource grant for a specific mobile, while the Secondary AG message provides an uplink resource grant for a group of mobiles served by the cell. In the prior art, when E-DCH transmission is started, if the IE "Serving Grant" is not provided, the mobile cannot use the AG values identified by the Secondary AG messages, so that the only way to control transmission grant of the mobile is through the Primary AG messages, which increases signaling overhead. In comparison, through the process 30, when E-DCH transmission is started, if the IE "Serving Grant" is not provided, the mobile can still use the AG values identified by the Secondary AG messages, so that signaling overhead of the network can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling uplink transmission start used in a mobile of a wireless communications system comprising:
    when an uplink transmission is started, if a predefined information element (IE) is not received, setting a primary state variable to "none" to indicate that a Serving Grant (SG) value can be affected by a Secondary Absolute Grant message wherein the predefined IE contains IE's "Serving Grant value" and "Primary/Secondary Grant Selector" and wherein setting the primary state variable to "non" is setting a variable Primary_Grant_Available to "false".

2. The method of claim 1, wherein the uplink transmission is performed on an Enhanced Dedicated Transport Channel of a High Speed Uplink Packet Access system.

3. A communications device of a wireless communications system utilized for efficiently handling uplink transmission start to avoid radio resource waste comprising:
    a control circuit for realizing functions of the communications device;
    a processor installed in the control circuit for executing a program code to operate the control circuit; and
    a memory coupled to the processor for storing the program code;
    wherein the program code comprises:
    when an uplink transmission is started, if a predefined information element (IE) is not received, setting a primary state variable to "none" to indicate that a Serving Grant (SG) value can be affected by a Secondary Absolute Grant message wherein the predefined IE contains IE's "Serving Grant value" and "Primary/Secondary Grant Selector" and wherein setting the primary state variable to "non" is setting a variable Primary_Grant_Available to "false".

4. The communications device of claim 3, wherein the uplink transmission is performed on an Enhanced Dedicated Transport Channel of a High Speed Uplink Packet Access system.

* * * * *